US012798924B2

(12) United States Patent
Huang et al.

(10) Patent No.: US 12,798,924 B2
(45) Date of Patent: Nov. 17, 2026

(54) STEREO GARAGE

(71) Applicant: CSCEC Smart Parking Technology Co., Ltd., Shenzhen (CN)

(72) Inventors: Facheng Huang, Shenzhen (CN); Hongyan Wang, Shenzhen (CN); Zhenyu Wang, Shenzhen (CN); Shaoyuan Peng, Shenzhen (CN); Longkang Yin, Shenzhen (CN); Lifeng Huang, Shenzhen (CN); Xin Lou, Shenzhen (CN); Jing Chen, Shenzhen (CN); Jianquan Yu, Shenzhen (CN)

(73) Assignee: CSCEC Smart Parking Technology Co., Ltd., Bao'an District (CN)

( * ) Notice: Subject to any disclaimer, the term of this patent is extended or adjusted under 35 U.S.C. 154(b) by 460 days.

(21) Appl. No.: 18/490,318

(22) Filed: Oct. 19, 2023

(65) Prior Publication Data

US 2024/0151057 A1 May 9, 2024

(30) Foreign Application Priority Data

Oct. 28, 2022 (CN) ......................... 202211335103.4

(51) Int. Cl.
*B66B 13/02* (2006.01)
*E04H 6/18* (2006.01)

(52) U.S. Cl.
CPC ............. *B66B 13/02* (2013.01); *E04H 6/188* (2013.01)

(58) Field of Classification Search
CPC .......... B66B 13/02; B66B 13/30; E04H 6/188
See application file for complete search history.

(56) References Cited

FOREIGN PATENT DOCUMENTS

| | | | | |
|---|---|---|---|---|
| CN | 201818090 U | | 5/2011 | |
| CN | 102518331 A | | 6/2012 | |
| CN | 120534844 A | * | 8/2025 | ............... B66B 5/00 |
| CN | 120736390 A | * | 10/2025 | ............... B66B 5/00 |

(Continued)

OTHER PUBLICATIONS

Machine Translation of JPH 06-129131.*

(Continued)

*Primary Examiner* — Diem M Tran
(74) *Attorney, Agent, or Firm* — JEEN IP LAW, LLC

(57) ABSTRACT

The present invention discloses a stereo garage that comprises: a main body provided with a lifting shaft, wherein the lifting shaft is provided with an opening; a lifting platform located in the lifting shaft, wherein the lifting platform can ascend or descend in the lifting shaft along a height direction of the main body, such that the lifting platform can switch between an initial position and an end position, wherein the lifting platform can close the opening when the lifting platform is located in the initial position; an anti-falling device connected to the main body, wherein the anti-falling device comprises a blocking rod which can be switched between a locking position and an unlocking position; wherein, the blocking rod can block a movement of a vehicle when the blocking rod is located in the locking position, and the lifting platform can cause the blocking rod to be switched from the locking position to the unlocking position when the lifting platform comes into the initial position. The stereo garage of the present invention can effectively prevent the safety problem caused by failure of the power system.

9 Claims, 8 Drawing Sheets

(56) References Cited

FOREIGN PATENT DOCUMENTS

| | | | | | |
|---|---|---|---|---|---|
| JP | H06129131 | A | | 5/1994 | |
| KR | 20050011557 | A | * | 1/2005 | |
| WO | WO-2021139908 | A1 | * | 7/2021 | ............. E05D 15/16 |

OTHER PUBLICATIONS

First Office Action dated Jan. 7, 2025 of corresponding CN patent application No. 202211335103.4.
Second Office Action dated Jun. 25, 2025 of corresponding CN patent application No. 202211335103.4.
Decision of Refusal dated Jul. 29, 2025 of corresponding CN patent application No. 202211335103.4.

* cited by examiner

STEREO GARAGE

CROSS REFERENCE TO RELATED APPLICATIONS

The present invention claims priority to the Chinese patent application No. 202211335103.4 filed on Oct. 28, 2022 to the CNIPA and entitled "Stereo Garage", which is incorporated herein by reference in its entirety.

TECHNICAL FIELD

The present invention relates to the technical field of stereo garages, in particular relates to a stereo garage.

BACKGROUND TECHNOLOGY

In the related art, a stereo garage is sometimes arranged underground and becomes an underground stereo garage. This not only saves space, but also facilitates people making better use of land resources. When parking vehicles in the existing stereo garage, vehicles will be transferred from above the ground to underground by means of a lifting platform, and therefore safety is an extremely important part in the process of transferring vehicles. Furthermore, because a space similar to a pit will be formed after descending of the lifting platform of the stereo garage, anti-falling doors are usually arranged around the pit. However, because the existing anti-falling doors are all controlled by a power system and the power system may have maloperation or failure, it may lead to accidental opening of the anti-fall doors and cause a vehicle to fall into the pit.

SUMMARY

The present invention aims to solve at least one of the technical problems existing in the prior art. For this, the present invention provides a stereo garage, which can effectively prevent the safety problem caused by failure of the power system.

The stereo garage according to embodiments of a first aspect of the present invention comprises:

- a main body provided with a lifting shaft, wherein the lifting shaft is provided with an opening;
- a lifting platform located in the lifting shaft, wherein the lifting platform can ascend or descend in the lifting shaft along a height direction of the main body, such that the lifting platform can switch between an initial position and an end position, wherein the lifting platform can close the opening when the lifting platform is located in the initial position;
- an anti-falling device connected to the main body, wherein the anti-falling device comprises a blocking rod which can be switched between a locking position and an unlocking position;
- wherein, the blocking rod can block a movement of a vehicle when the blocking rod is located in the locking position, and the lifting platform can cause the blocking rod to be switched from the locking position to the unlocking position when the lifting platform comes into the initial position.

The stereo garage according to the embodiments of the present invention has at least the following beneficial effects: when a vehicle is parked into the stereo garage, the vehicle needs to be transferred to a parking space through the lifting platform, wherein sometimes the lifting platform is at the end position and has not yet risen to the initial position, and if the power system of the anti-falling door malfunctions to cause the anti-falling door to be opened, the vehicle may accidentally fall into the lifting shaft, and there would be very dangerous consequences; further, when the blocking rod of the anti-falling device is located in the locking position, the blocking rod can block the movement of the vehicle, such that, even if the vehicle is out of control or the driver makes a mistake while the anti-falling door is opened due to a malfunction, because the blocking rod has blocked the vehicle, the vehicle would not be driven into the lifting shaft and danger would not be caused; and it is only when the lifting platform rises and comes into the initial position that the lifting platform can cause the blocking rod to be switched from the locking position to the unlocking position, such that the movement of the vehicle is no longer blocked after the blocking rod is switched to the unlocking position, therefore, at this time, even if the vehicle is driven by mistake and the anti-falling door is opened due to a malfunction, the vehicle moving forward would be driven onto the lifting platform. In this way, the stereo garage can effectively prevent the safety problems caused by failure of the power system.

According to the stereo garage of some embodiments of the present invention, the anti-falling device comprises a connection member, an abutting rod, a first pulley, a first guide rail and a second guide rail, wherein the first pulley is fixedly connected to the top of the first guide rail, and along the height direction of the stereo garage, the abutting rod is slidably connected on the second guide rail, the blocking rod is slidably connected on the first guide rail, the connection member is wound around the first pulley, one end of the connection member is connected to the abutting rod and the other end thereof is connected to the blocking rod, wherein, the lifting platform can abut against the abutting rod to cause the blocking rod to move relative to the abutting rod and be switched from the locking position to the unlocking position.

According to the stereo garage of some embodiments of the present invention, the anti-falling device comprises a connection member, an abutting rod, a first pulley, a first guide rail, a second guide rail, a second pulley and an extension rod, wherein one end of the extension rod is connected to a side wall at the top of the first guide rail, the second pulley is fixedly connected to the abutting rod, the first pulley is fixedly connected to the top of the first guide rail, and along the height direction of the stereo garage, the abutting rod is slidably connected on the second guide rail, the blocking rod is slidably connected on the first guide rail, the connection member is wound around the first pulley and the second pulley in sequence, one end of the connection member is connected to the extension rod and the other end thereof is connected to the blocking rod, wherein, the lifting platform can abut against the abutting rod to cause the blocking rod to move relative to the abutting rod and be switched from the locking position to the unlocking position.

According to the stereo garage of some embodiments of the present invention, the connecting connection member is provided as a wire rope.

According to the stereo garage of some embodiments of the present invention, the bottom of the second guide rail is provided with a position-limiting part, which can limit the sliding of the abutting rod on the second guide rail, and a weight of the abutting rod is greater than that of the blocking rod.

According to the stereo garage of some embodiments of the present invention, two position-limiting parts are respectively provided at the top and bottom of the second guide rail.

According to the stereo garage of some embodiments of the present invention, the lifting platform comprises a base and a protruding rod, the protruding rod is connected to the base, and the protruding rod protrudes from one end of the base and can abut against the abutting rod.

According to the stereo garage of some embodiments of the present invention, the stereo garage further comprises a vehicle-driving passage, and the vehicle-driving passage and the lifting platform are respectively located at two sides of the anti-falling device.

According to the stereo garage of some embodiments of the present invention, when the blocking rod is in the locking position, a distance between the blocking rod and an upper surface of the vehicle-driving passage is 30 cm-50 cm along the height direction of the stereo garage.

According to the stereo garage of some embodiments of the present invention, one vehicle-driving passage and one anti-falling device are set as a lane group, and two such lane groups are oppositely provided at two ends relative to the lifting platform, respectively.

Additional aspects and advantages of the present invention will be set forth in part in the following description, and in part will become obvious from the following description, or can be learned by practice of the present invention.

BRIEF DESCRIPTION OF THE DRAWINGS

The present invention will be further described with reference to the embodiments and the accompanying drawings, in which.

REFERENCE NUMERALS

Figure 1:
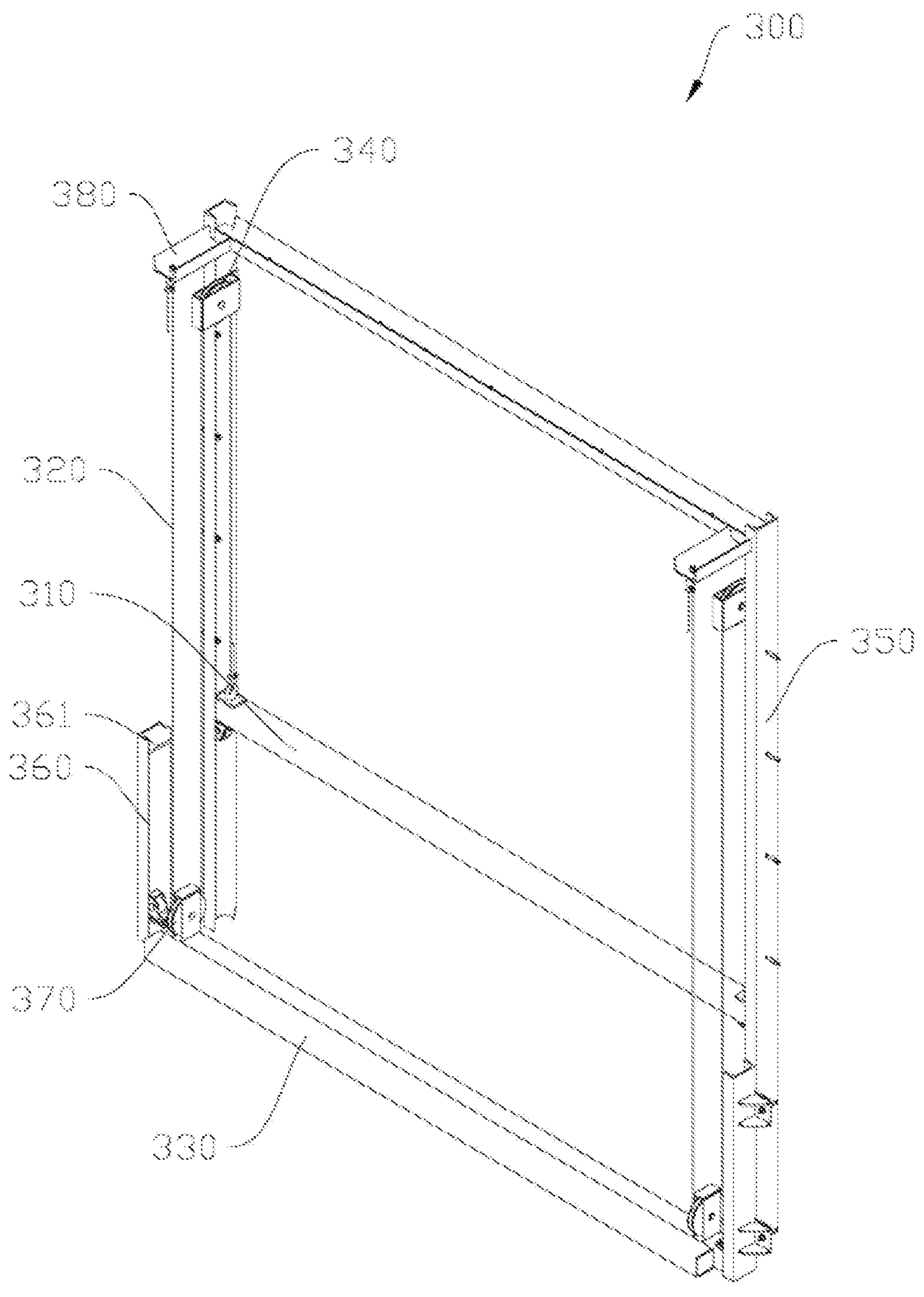
FIG. 1 is a schematic diagram of an anti-falling device of a stereo garage of some embodiments of the present invention.
Figure 2:
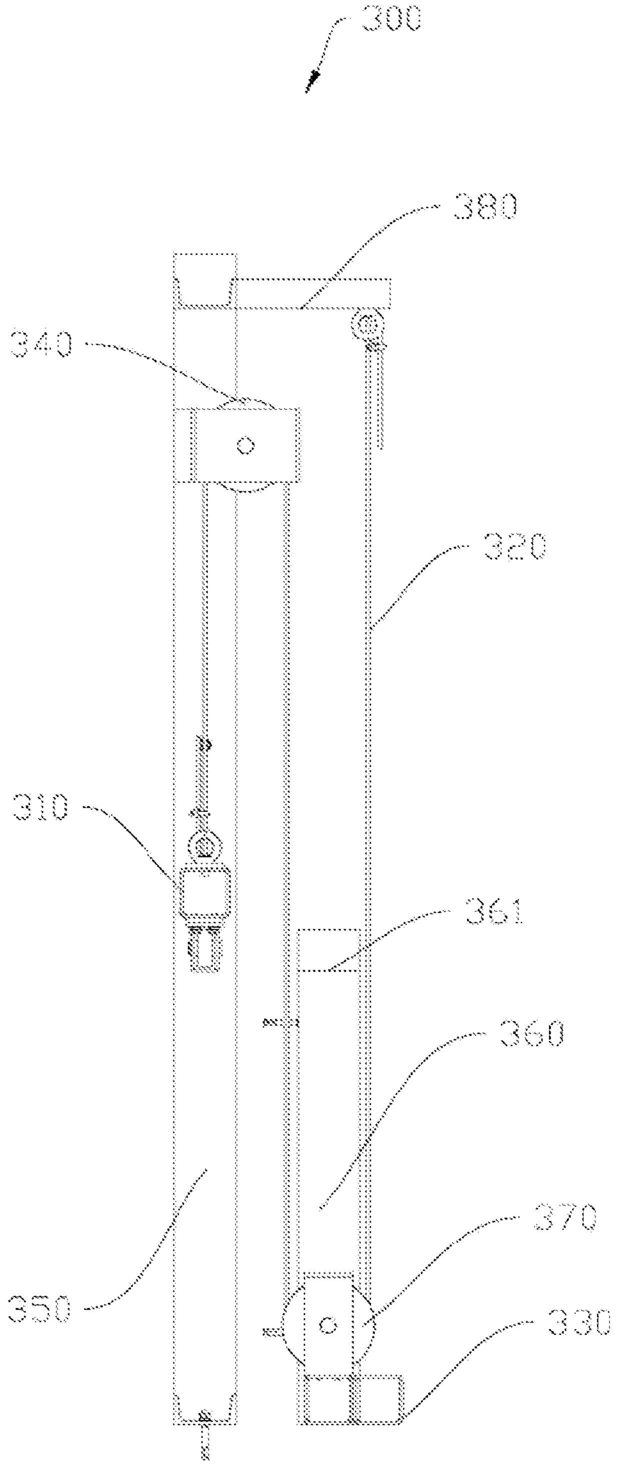
FIG. 2 is another schematic diagram of an anti-falling device of a stereo garage of some embodiments of the present invention.

10—stereo garage; 100—main body; 110—lifting shaft; 200—lifting platform; 210—base; 220—protruding rod; 300—anti-falling device; 310—blocking rod; 320—connection member; 330—abutting rod; 340—first pulley; 350—first guide rail; 360—second guide rail; 361—position-limiting part; 370—second pulley; 380—extension rod; 400—vehicle-driving passage.

DETAILED DESCRIPTION OF THE SPECIFIC EMBODIMENTS

Hereinafter, embodiments of the present invention will be described in detail, examples of which are illustrated in the accompanying drawings, wherein the same or similar reference numerals represent the same or similar elements or elements having the same or similar functions throughout. The embodiments described below by referring to the drawings are exemplary, only for explaining the present invention, and cannot be understood as a limitation to the present invention.

In the description of the present invention, it should be understood that, with respect to description of orientations, the orientational or positional relationship indicated by terms such as up, down, front, back, left, right, etc. is based on the orientational or positional relationship shown in the accompanying drawings, and is only for the convenience of describing the present invention and simplifying the description, and does not indicate or imply that the device or element referred to must have a specific orientation or be constructed and operated in a specific orientation, so it cannot be understood as a limitation to the present invention.

In the description of the present invention, the meaning of "several" is more than one, the meaning of "a plurality of" is more than two, "greater than", "less than", "more than", etc. are understood to exclude the present number, and above, below, within, etc. are understood to include the present number. If there is a mentioning of "the first", "the second", it is only used for the purpose of distinguishing technical features from each other, and is not to be understood as indicating or implying relative importance or implicitly specifying the number of the mentioned technical features or implicitly specifying the sequential relationship of the mentioned technical features.

In the description of the present invention, unless otherwise expressly defined, terms such as "arranged", "installed", "connected" and the like shall be broadly construed, and a person skilled in the art can reasonably determine the specific meaning of these terms in the present invention by considering the context of the specific contents of the technical solution.

In the description of the present invention, reference terms such as "an embodiment", "some embodiments", "schematic embodiments", "examples", "specific examples", or "some examples" intends to mean that the specific features, structures, materials, or characteristics described in connection with the mentioned embodiment or example are included in at least one embodiment or example of the present invention. In the present specification, schematic statement of the above terms does not necessarily refer to the same embodiment or example. Moreover, the specific features, structures, materials, or characteristics described may be combined in any one or more embodiments or examples in a suitable manner.

In the related art, a stereo garage 10 is sometimes arranged underground and becomes an underground stereo garage 10. This not only saves space, but also facilitates people making better use of land resources. When parking vehicles into the existing stereo garage 10, vehicles will be transferred from above the ground to underground by means of a lifting platform 200, and therefore safety is an extremely important part in the process of transferring vehicles.

Furthermore, because a space similar to a pit will be formed after descending of the lifting platform 200 of the stereo garage 10, anti-falling doors are usually arranged around the pit. The anti-falling door is controlled by a motor or another electrical system to open or close. After opening, a vehicle can pass through the anti-falling door and reach the lifting platform 200 for transferring and parking. However, because the existing anti-falling doors are all operated by a power system and the power system may have maloperation or failure, it may lead to accidental opening of the anti-falling door. For example, the anti-falling door is opened by manually operating the power system, and a vehicle may fall into the pit due to the driver's wrong driving. Thus, the present application proposes a stereo garage 10.

Figure 7:
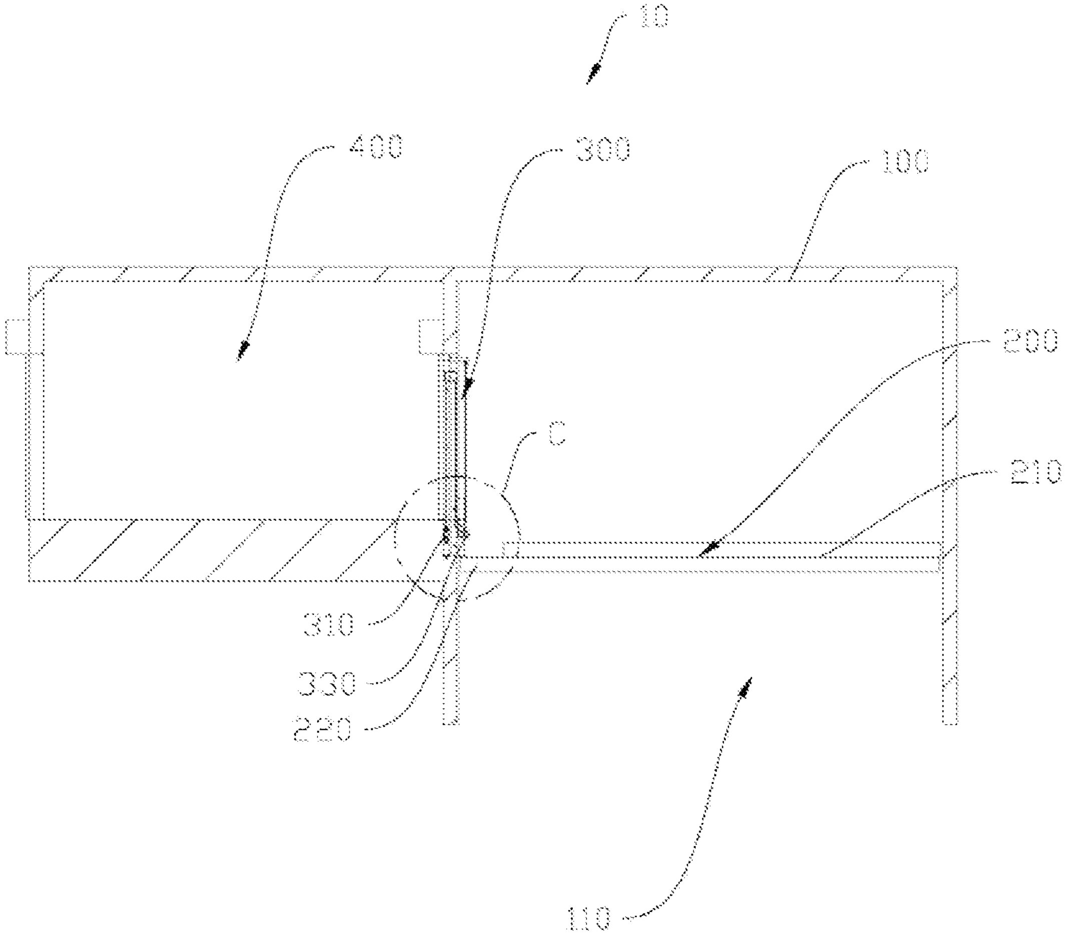
FIG. 7 is a schematic diagram of a stereo garage of some embodiments of the present invention when the lifting platform thereof has come into the initial position.
Figure 8:
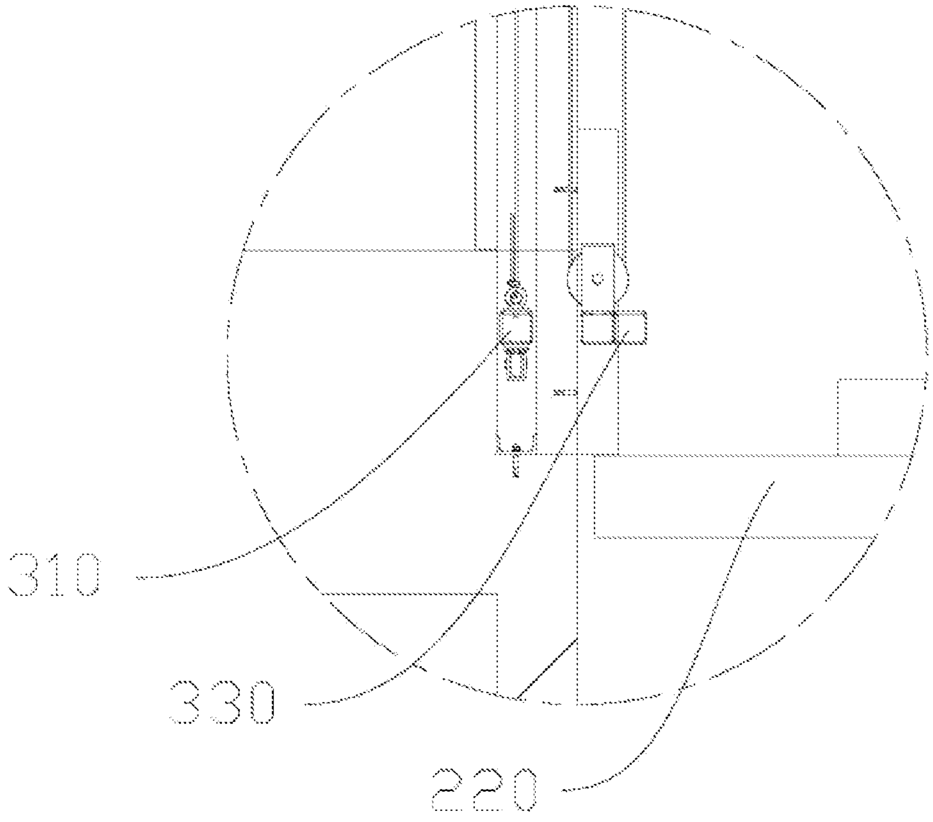
FIG. 8 is an enlarged view at the part C in FIG. 7.

Referring to FIG. 1 and FIG. 7, FIG. 1 is a schematic diagram of the anti-falling device 300 of the stereo garage 10 of some embodiments of the present invention, and FIG. 7 is a schematic diagram of the stereo garage 10 of some embodiments of the present invention when the lifting platform 200 has come into an initial position, i.e., the blocking rod 310 of the anti-falling device 300 is in an unlocking position in FIG. 7. In some embodiments, the stereo garage 10 comprises a main body 100, a lifting platform 200 and an anti-falling device 300. The main body 100 is provided with a lifting shaft 110 with an opening, wherein the lifting shaft 110 can be a storage cavity with an opening, a plurality of parking spaces are provided at the side wall of the storage cavity, and then the parking spaces are arranged on a plurality of floors in the height direction of the stereo garage 10, such that the lifting platform 200 enables vehicles to be parked onto parking spaces of different floors; the lifting platform 200 is located in the lifting shaft 110, and can ascend or descend in the lifting shaft 110 along the height direction of the main body 100, such that the lifting platform 200 can switch between an initial position and an end position, wherein the lifting platform 200 can close the opening when the lifting platform 200 is located in the initial position, specifically, it can be imagined that the end position is the lowest position of the lifting shaft 110, that is, at the lowest floor of parking space, such that when the lifting platform 200 is at the lowest place, the lifting shaft 110 will be similar to a pit, and if a vehicle falls into it, the consequences will be dreadful to contemplate. On the other hand, the initial position is at the highest floor of parking space. If it is an underground stereo garage 10, the initial position is flush with the ground level, and the end position is deep underground. The anti-falling device 300 is connected to the main body 100. The anti-falling device 300 may be provided behind the anti-falling door to play the role of secondary protection, as for the anti-falling door being controlled to open or close by a motor or the like, this technology is relatively common and will not be described herein, the anti-falling device 300 comprises a blocking rod 310 which can be switched between a locking position and an unlocking position; wherein, the blocking rod 310 can block a movement of a vehicle when the blocking rod 310 is located in the locking position, and the lifting platform 200 can cause the blocking rod 310 to be switched from the locking position to the unlocking position when the lifting platform 200 comes into the initial position.

Specifically, when a vehicle is parked into the stereo garage 10, the vehicle needs to be transferred to a parking space through the lifting platform 200. Sometimes, the lifting platform 200 is at the end position and has not yet risen to the initial position. At this time, if the power system of the anti-falling door malfunctions to cause the anti-falling door to be opened, the vehicle may accidentally fall into the lifting shaft 110, and there would be very dangerous consequences. Further, when the blocking rod 310 of the anti-falling device 300 is in the locking position, the blocking rod 310 can block the movement of the vehicle, such that, even if the vehicle is out of control or the driver makes a mistake while the anti-falling door is opened due to a malfunction, the vehicle would not be driven into the lifting shaft 110 because the blocking rod 310 blocks the vehicle, thus danger would not be caused, and it is only when the lifting platform 200 rises and comes into the initial position that the lifting platform 200 can cause the blocking rod 310 to be switched from the locking position to the unlocking position, such that, after the blocking rod 310 is switched to the unlocking position, the movement of the vehicle is no longer blocked, and even if the vehicle is wrongly driven and the anti-falling door is wrongly opened, the vehicle would advance onto the lifting platform 200. In this way, the stereo garage 10 can effectively prevent the safety problems caused by failure of the power system. Specifically, by means of the anti-falling device 300 of the present application, it is only when the lifting platform 200 has come into the initial position that the blocking rod 310 will not restrict the movement of a vehicle, and if the lifting platform 200 is not in the initial position, the blocking rod 310 will not release the restriction on the vehicle.

Figure 3:
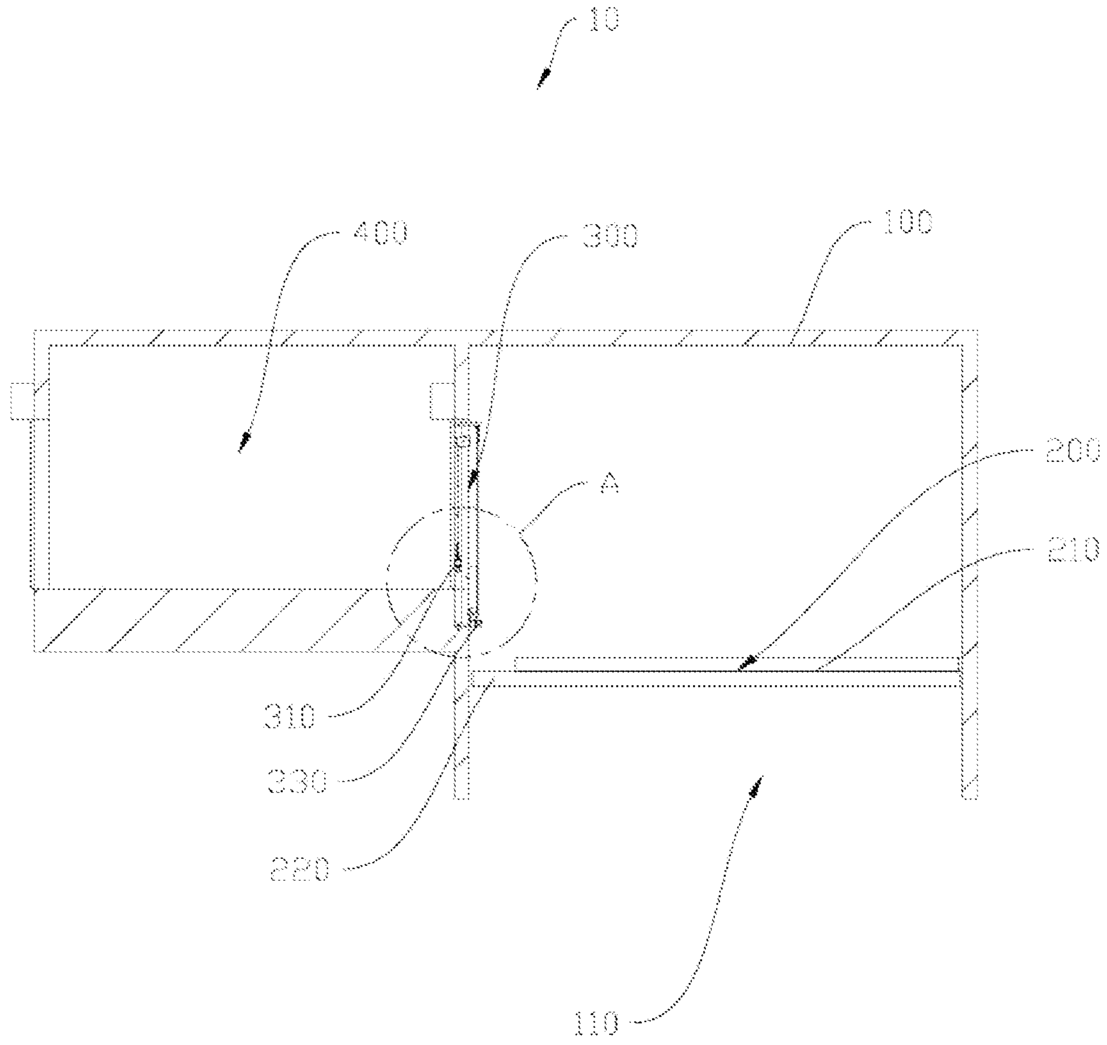
FIG. 3 is a schematic diagram of a stereo garage of some embodiments of the present invention when the lifting platform thereof has not yet come into the initial position.
Figure 4:
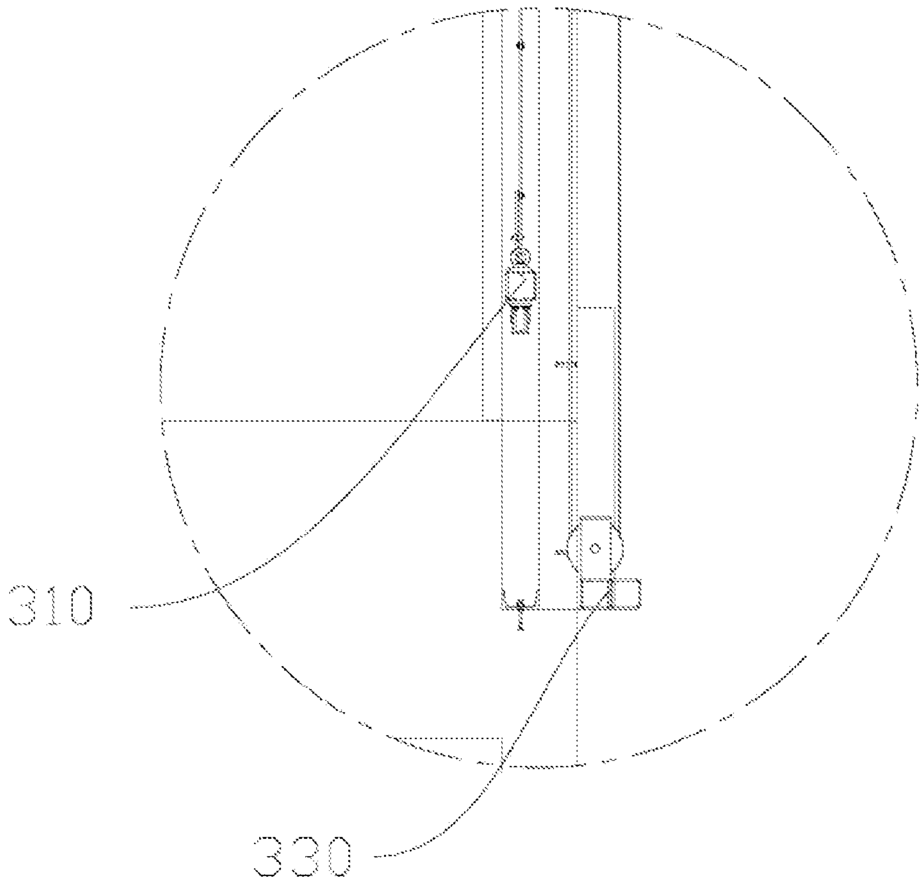
FIG. 4 is an enlarged view at the part A in FIG. 3.
Figure 5:
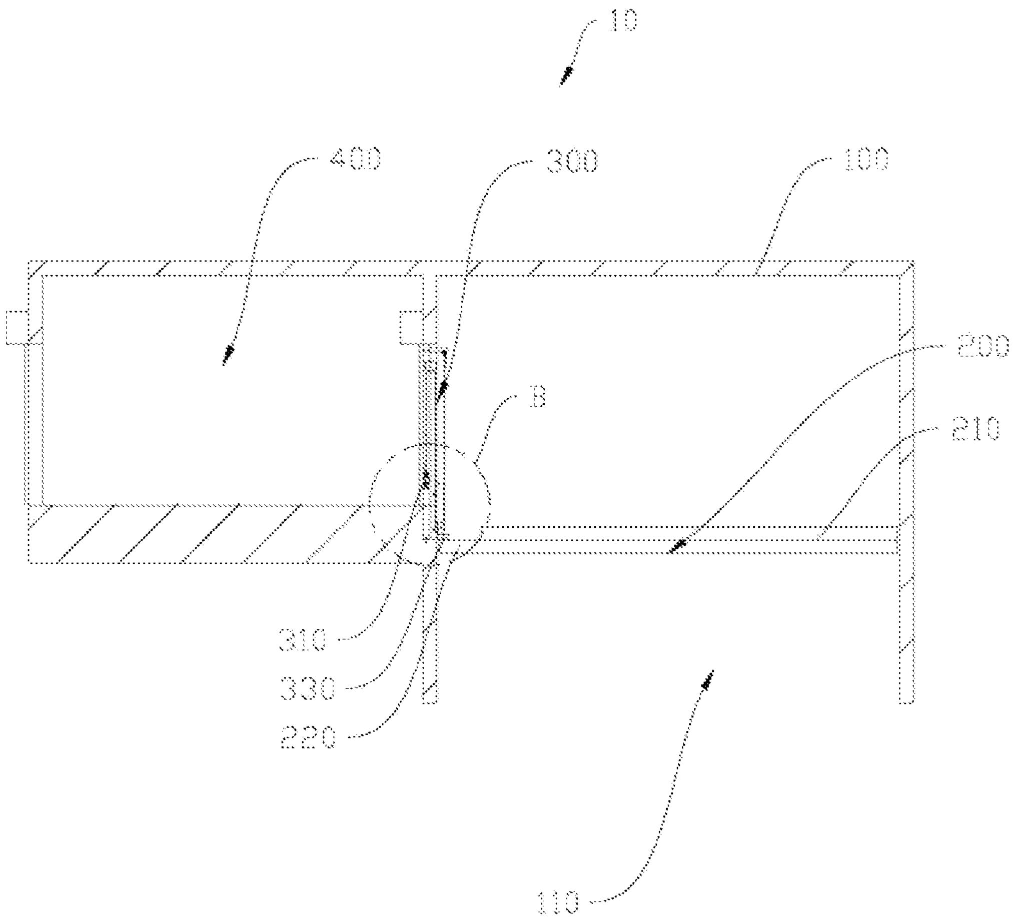
FIG. 5 is a schematic diagram of a stereo garage of some embodiments of the present invention when the protruding rod of the lifting platform thereof becomes abutting against the abutting rod.
Figure 6:
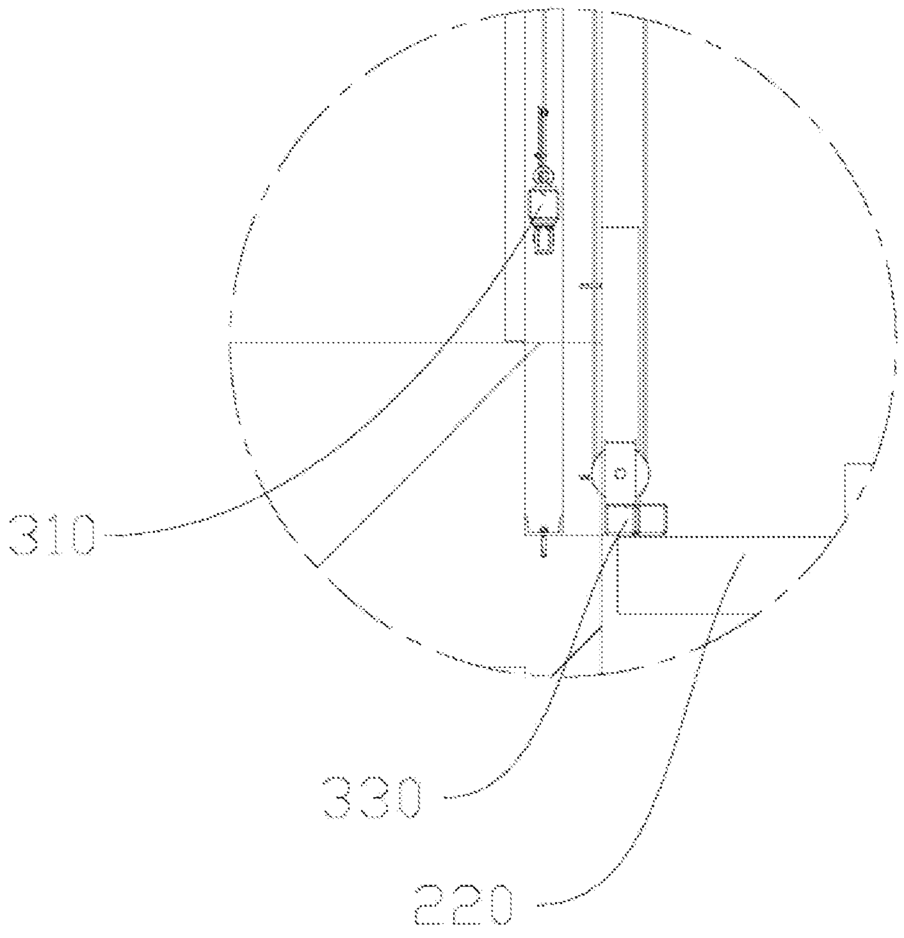
FIG. 6 is an enlarged view at the part B in FIG. 5.

Referring to FIG. 1 to FIG. 8, wherein, FIG. 3 is a schematic diagram of the stereo garage 10 according to some embodiments of the present invention when the lifting platform 200 thereof does not yet come into the initial position, that is, the blocking rod 310 in FIG. 3 is in the locking position, thereby blocking the movement of the vehicle; FIG. 5 is a schematic diagram of the stereo garage 10 according to some embodiments of the present invention when the protruding rod of the lifting platform 200 thereof becomes abutting against the abutting rod, that is, under the action of the protruding rod 220, the abutting rod 330 in FIG. 5 starts to move up, and at the same time, the blocking rod 310 falls down and moves into the unlocking position; FIG. 7 is a schematic diagram of the stereo garage 10 according to some embodiments of the present invention when the lifting platform 200 thereof has come into the initial position, that is, the blocking rod 310 is in the unlocking position. In some embodiments, the anti-falling device 300 comprises a connection member 320, an abutting rod 330, a first pulley 340, a first guide rail 350 and a second guide rail 360, the first pulley 340 is fixedly connected to the top of the first guide rail 350, and the first pulley 340 can be regarded as a fixed pulley, and along the height direction of the stereo garage 10, the abutting rod 330 is slidably connected on the second guide rail 360, the blocking rod 310 is slidably connected on the first guide rail 350, the connection member 320 is wound around the first pulley 340, one end of the connection member 320 is connected to the abutting rod 330 and the other end thereof is connected to the blocking rod 310, wherein the lifting platform 200 can abut against the abutting rod 330 to cause the blocking rod 310 to move relative to the abutting rod 330, that is, when the abutting rod 330 rises, the blocking rod 310 moves down, and when the abutting rod 330 moves down, the blocking rod 310 rises so as to be switched from the locking position to the unlocking position. Specifically, the connection member 320 can be a wire rope or a chain. When the connection member 320 is a wire rope, the first pulley 340 is provided with a groove for winding the wire rope. When the connection member 320 is a chain, the first pulley 340 is provided with a plurality of teeth circumferentially surrounding the center of the first pulley 340 for winding the chain. Further, when the lifting platform 200 abuts against the abutting rod 330, the lifting platform 200 can drive the abutting rod 330 to move upward, and at the same time of the abutting rod 330 moving upward, the blocking rod 310 moves downward, such that the vehicle movement will not be blocked after the blocking rod 310 moves downward. On the contrary, if the lifting platform 200 is not in the initial position, the lifting platform 200 does not abut against the abutting rod 330. At this time, the abutting rod 330 maintains its original state, and the blocking rod 310 also remains motionless, that is, the blocking rod 310 is in the locking position, which blocks the movement of the vehicle.

Referring to FIG. 1 to FIG. 8, in some embodiments, the anti-falling device 300 comprises a connection member 320, an abutting rod 330, a first pulley 340, a first guide rail 350, a second guide rail 360, a second pulley 370 and an extension rod 380, one end of the extension rod 380 is connected to a side wall at the top of the first guide rail 350, and the second pulley 370 is fixedly connected to the abutting rod 330, since the abutting rod 330 can slidably move relative to the second guide rail 360, the second pulley 370 is equivalent to a movable pulley, the first pulley 340 is fixedly connected to the top of the first guide rail 350, and along the height direction of the stereo garage 10, the abutting rod 330 is slidably connected on the second guide rail 360, the blocking rod 310 is slidably connected on the first guide rail 350, the connection member 320 is wound around the first pulley 340 and the second pulley 370 in sequence, one end of the connection member 320 is connected to the extension rod 380 and the other end thereof is connected to the blocking rod 310, wherein, the lifting platform 200 can abut against the abutting rod 330 to cause the blocking rod 310 to move relative to the abutting rod 330 and be switched from the locking position to the unlocking position. Specifically, when the lifting platform 200 rises from the end position to the initial position, the lifting platform 200 will become abutting against the abutting rod 330, such that the abutting rod 330 will move up, such that the blocking rod 310 will move down at the same time, and the movement of the vehicle will not be blocked after the blocking rod 310 moves down. On the contrary, if the lifting platform 200 is not in the initial position, the lifting platform 200 does not abut against the abutting rod 330. At this time, the abutting rod 330 maintains its original state, and the blocking rod 310 also remains motionless, that is, the blocking rod 310 is in the locking position, which blocks the movement of the vehicle.

Referring to FIG. 1, in some embodiments, the connection member 320 is provided as a wire rope. Specifically, no matter whether the two ends of the wire rope are connected to the first guide rail 350 or other positions, the wire rope can facilitate the workers adjusting the tightness of the wire rope, so as to ensure the relative movement of the abutting rod 330 and the blocking rod 310, that is, the abutting rod 330 can smoothly ascend while the blocking rod 310 can smoothly descend, the abutting rod 330 can smoothly descend while the blocking rod 310 can smoothly ascend.

Referring to FIG. 1, in some embodiments, the bottom of the second guide rail 360 is provided with a position-limiting part 361, which can limit the sliding of the abutting rod 330 on the second guide rail 360, and a weight of the abutting rod 330 is greater than that of the blocking rod 310, specifically, the position-limiting part 361 can be a limiting block, and the limiting block is connected to the second guide rail 360, so as to limit the sliding of the abutting rod 330, that is, when the abutting rod 330 slides and becomes abutting against the limiting block, it would stop moving. In order to make it convenient for the lifting platform 200 to abut against the abutting rod 330 to drive the abutting rod 330 to slide and thereby cause the blocking rod 310 to slide, the anti-falling device 300 can initially be set to have a weight of the abutting rod 330 greater than that of the blocking rod 310. In this way, the blocking rod 310 will move down under the action of gravity, so that the blocking rod 310 will rise, and the blocking rod 310 will become higher than the vehicle-driving passage 400, which will block the vehicle from moving forward. Further, in order to prevent the abutting rod 330 from moving down all along to cause the blocking rod 310 to rise to a very high height, even higher than the height of the vehicle, which would not have the effect of blocking the movement of the vehicle, the position-limiting part 361 is provided to stop the abutting rod 330 from further moving down after it has descended to a certain distance, such that the blocking rod 310 does not continue to rise, so the blocking rod 310 can be in a proper position that just blocks the vehicle.

Referring to FIG. 1, in some embodiments, two position-limiting parts 361 are respectively provided at the top and bottom of the second guide rail 360, specifically, when one of the limiting parts 361 is provided at the bottom of the second guide rail 360, this position-limiting part 361 can limit the abutting rod 330 from continuously moving down under the action of gravity, and when the other of the position-limiting parts 361 is provided at the top of the second guide rail 360, that position-limiting part 361 can limit the abutting rod 330 from continuously rising under the abutting action of the lifting platform 200.

Referring to FIG. 3, in some embodiments, the lifting platform 200 comprises a base 210 and a protruding rod 220, the protruding rod 220 is connected to the base 210 and protrudes from one end of the base 210, and the protruding rod 220 can abut against the abutting rod 330. Specifically, as it protrudes out, the protruding rod 220 is specially used for abutting against the abutting rod 330, such that the abutting rod 330 moves relative to the blocking rod 310, and the blocking rod 310 is switched between the locking position and the unlocking position, wherein the contact area between the protruding rod 220 and the abutting rod 330 can be set to be relatively large, such that it is ensured that the protruding rod 220 can abut against the abutting rod 330.

Referring to FIG. 3, in some embodiments, the stereo garage 10 further comprises a vehicle-driving passage 400, and the vehicle-driving passage 400 and the lifting platform 200 are respectively located at two sides of the anti-falling device 300. Specifically, the vehicle-driving passage 400 makes it convenient for vehicles to be driven in. After a vehicle is driven onto the vehicle-driving passage 400, it can reach the lifting platform 200 after passing through the anti-falling door and the anti-falling device 300, wherein the vehicle-driving passage 400 can be provided with a vehicle carrying plate and a conveyor belt, so as to park the vehicle on the vehicle carrying plate which moves on the conveyor belt, thereby allowing the driver not to drive in person and realizing automatic parking.

Referring to FIG. 3, in some embodiments, when the blocking rod 310 is in the locking position, the distance between the blocking rod 310 and the upper surface of the vehicle-driving passage 400 is 30 cm-50 cm along the height direction of the stereo garage 10. Specifically, when the distance between the blocking rod 310 and the vehicle-driving passage 400 is 35 cm, the height of the blocking rod 310 can be equal to about one half of the body height of the vehicle, and since the main structure of the vehicle is more than 10 cm away from the ground, that is, the height of the chassis is more than 10 cm, the blocking rod 310 can just blocks against the main steel frame of the vehicle, and as the strength of the steel frame is very high, under a large contact force of the vehicle, the vehicle can be prevented from being damaged by the impact reaction force in the opposite direction.

In some embodiments, one vehicle-driving passage 400 and one anti-falling device 300 are set as a lane group, and there are two lane groups, and two such lane groups are oppositely provided at two ends relative to the lifting platform 200, respectively. Specifically, in order to make it convenient for vehicles to be quickly parked into the stereo garage 10 from all directions, be means of such arrangement, vehicles can enter the lifting platform 200 from the two lane groups, thus saving time for parking personnel.

The embodiments of the present invention have been described in detail with reference to the accompanying drawings, but the present invention is not limited to the above embodiments, and various changes can be made within the scope of knowledge possessed by a person of ordinary skill in the art to which it pertains, without departing from the purpose of the present invention. Furthermore, the respective embodiments of the present invention and the various features in the embodiments can be combined with each other as long as there is no conflict between them.

The invention claimed is:

1. A stereo garage, characterized in comprising:

a main body provided with a lifting shaft, wherein the lifting shaft is provided with an opening;

a lifting platform located in the lifting shaft, wherein the lifting platform can ascend or descend in the lifting shaft along a height direction of the main body, such that the lifting platform can switch between an initial position and an end position, wherein the lifting platform can close the opening when the lifting platform is located in the initial position;

an anti-falling device connected to the main body, wherein the anti-falling device comprises a blocking rod which can be switched between a locking position and an unlocking position;

wherein, the blocking rod can block a movement of a vehicle when the blocking rod is located in the locking position, and the lifting platform can cause the blocking rod to be switched from the locking position to the unlocking position when the lifting platform comes into the initial position, wherein, the anti-falling device further comprises an abutting rod, a second guide rail, and along the height direction of the stereo garage, the abutting rod is slidably connected on the second guide rail, the lifting platform can abut against the abutting rod to cause the blocking rod to move relative to the abutting rod and be switched from the locking position to the unlocking position, and wherein, the bottom of the second guide rail is provided with a position-limiting part, which can limit the sliding of the abutting rod on the second guide rail, and a weight of the abutting rod is greater than a weight of the blocking rod.

2. The stereo garage according to claim 1, characterized in that, the anti-falling device comprises a connection member, an abutting rod, a first pulley, a first guide rail and a second guide rail, wherein the first pulley is fixedly connected to the top of the first guide rail, and along the height direction of the stereo garage, the abutting rod is slidably connected on the second guide rail, the blocking rod is slidably connected on the first guide rail, the connection member is wound around the first pulley, one end of the connection member is connected to the abutting rod and the other end thereof is connected to the blocking rod, wherein, the lifting platform can abut against the abutting rod to cause the blocking rod to move relative to the abutting rod and be switched from the locking position to the unlocking position.

3. The stereo garage according to claim 1, characterized in that, the anti-falling device further comprises a connection member, a first pulley, a first guide rail, a second pulley and an extension rod, wherein one end of the extension rod is connected to a side wall at the top of the first guide rail, the second pulley is fixedly connected to the abutting rod, the first pulley is fixedly connected to the top of the first guide rail, and along the height direction of the stereo garage, the blocking rod is slidably connected on the first guide rail, the connection member is wound around the first pulley and the second pulley in sequence, one end of the connection member is connected to the extension rod and the other end thereof is connected to the blocking rod.

4. The stereo garage according to claim 3, characterized in that, the connection member is provided as a wire rope.

5. The stereo garage according to claim 3, characterized in that, the lifting platform comprises a base and a protruding rod, the protruding rod is connected to the base, and the protruding rod protrudes from one end of the base and can abut against the abutting rod.

6. The stereo garage according to claim 1, characterized in that, two position-limiting parts are respectively provided at the top and bottom of the second guide rail.

7. The stereo garage according to claim 1, characterized in that, the stereo garage further comprises a vehicle-driving passage, and the vehicle-driving passage and the lifting platform are respectively located at two sides of the anti-falling device.

8. The stereo garage according to claim 7, characterized in that, when the blocking rod is in the locking position, a distance between the blocking rod and an upper surface of the vehicle-driving passage is 30 cm-50 cm along the height direction of the stereo garage.

9. The stereo garage according to claim 7, characterized in that, one vehicle-driving passage and one anti-falling device are set as a lane group, and two such lane groups are oppositely provided at two ends relative to the lifting platform, respectively.

* * * * *